United States Patent

[19]

Lin

[11] Patent Number: 6,072,261

[45] Date of Patent: Jun. 6, 2000

[54] MOTOR CONSTRUCTION

[75] Inventor: Kuo-Cheng Lin, Taoyuan, Taiwan

[73] Assignee: Delta Electronics, Inc., Taoyuan Shien, Taiwan

[21] Appl. No.: 09/022,838

[22] Filed: Feb. 12, 1998

[51] Int. Cl.[7] .............................. H02K 1/12; H02K 5/16; H02K 5/00; H02K 1/04

[52] U.S. Cl. .............................. 310/254; 310/90; 310/91; 310/43

[58] Field of Search .............................. 310/254, 91, 257, 310/258, 259, 256, 90, 179, 43

[56] References Cited

U.S. PATENT DOCUMENTS

| | | | |
|---|---|---|---|
| 4,783,608 | 11/1988 | Gruber et al. | 310/90 |
| 5,343,104 | 8/1994 | Takahashi et al. | 310/90 |
| 5,363,003 | 11/1994 | Harada et al. | 310/67 R |
| 5,529,023 | 6/1996 | Boardman | 114/303 |
| 5,610,462 | 3/1997 | Takahashi | 310/90 |

*Primary Examiner*—Nestor Ramirez
*Assistant Examiner*—Dang Dinh Le
*Attorney, Agent, or Firm*—Bacon & Thomas

[57] ABSTRACT

An improved motor structure comprising a hollow stator base having a substantially cylindrical hub including a central hole, and a hollow stator having a silicon steel sheets set and a central bore through which the hub is inserted upon assembling. The hub is composed of a plurality of first upright ribs and a plurality of second upright ribs which are of the same number and are alternately arranged in circumferential direction, and a substantially cylindrical lower portion connecting to the lower end of each upright rib. Each pair of adjacent first upright rib and second upright rib are slightly apart from each other. Every first upright rib has an outer engaging portion formed on the upper outer surface thereof and every second upright rib has an outer step portion formed on the outer surface thereof, whereby the silicon steel sheets set of the stator may be engaged by and between the outer engaging portion and the outer step portion so as to retain the stator in axial direction relative to the stator base. Besides, the hub has a first non-cylindrical outer surface, and the central bore of the stator has a second non-cylindrical inner surface engaged with the first non-cylindrical outer surface. Thus the stator may be retained in circumferential direction relative to the stator base through engagement between the first non-cylindrical outer surface and the second non-cylindrical inner surface.

3 Claims, 11 Drawing Sheets

MOTOR CONSTRUCTION

FIELD OF THE INVENTION

The present invention relates generally to an improved motor construction, and more particularly to a motor construction capable of positively positioning the stator, stator base and rotor bearing of a motor in its circumferential and axial direction.

BACKGROUND OF THE INVENTION

A conventional DC motor is shown in FIGS. 1 through 7B, among which FIGS. 1 through 4 illustrate the detailed construction and method of assembling the motor, and FIGS. 5 through 7A illustrate the detailed construction and method of assembling the armature section B in the same motor.

More specifically, FIG. 1 is a partially exploded perspective view of a conventional DC motor made up of a rotor (not shown) having a rotating shaft, a bearing 60, an armature section B composed of a hollow stator 70 and a circuit board 80, and a stator base 90. The bearing 60 has a central bore 61 that serves to rotatably support the rotating shaft of the rotor.

The circuit board 80 includes a motor control circuit (not shown) electrically connected to the winding of stator described below to control the operation of the motor, and a central hole 81 (see FIG. 5).

Referring to FIGS. 1, 6, and 7A, the stator 70 comprises a hollow set 71 of silicon steel sheets composed of plural stacked silicon steel sheets, a winding (denoted by a character W in FIG. 7B) adapted to generate a magnetic field required by the motor; a hollow cylindrical isolation bushing 72 adapted to separate and thus to isolate the silicon steel sheets set 71 and the winding, and plural positioning feet 73.

FIGS. 6, 7A, 7B illustrate the method of assembling the armature section B in the motor shown in FIG. 1. Specifically, FIG. 6 is a cutaway perspective view, FIG. 7A an enlarged fragmentary view of a "Y" part of FIG. 6, and FIG. 7B a further enlarged sectional view of a the vicinity of "Y" part illustrated upside down relative to with FIGS. 6 and 7A.

As shown in FIG. 7B, the afore-mentioned winding W is provided between the isolation bushing 72 and the plural positioning feet 73 of stator 70. For attaching the circuit board 80 to the stator 70 to form the armature section B (FIG. 1), the circuit board 80 is first laid over the positioning feet 73 and the lower end 72L of the isolation bushing 72, a positioning pin P is inserted into a hole provided in each locating foot 73, and one terminal portion of the winding W is wound around the post P. In the above situation, the circuit board 80, stator 70, and winding W together are moved through a tin bath (not shown) so as to solder the circuit board 80 to the stator 70 by means of the tin solder Q adhering to the circuit board 80 over the post P.

A drawback of the aforementioned assembly method of armature section B is explained below. While performing the soldering operation in the tin bath, if the clearance between the circuit board 80 and the lower end 72L of isolation bushing 72 is not uniform or if vibration occurs, positioning between the stator 70 and the circuit board 80 is apt to shift, thus resulting in warp or tilt of circuit board 80 in the armature section B.

As shown in FIG. 1 to FIG. 4, stator base 90 includes a base N adapted to receive circuit board 80; and a substantially cylindrical hollow hub M integrally formed in the central portion of the base N. The hub M includes a substantially cylindrical upper part 91; a substantially cylindrical lower part 92 slightly larger in its outer diameter than upper part 91; and a step portion 93 interconnecting the upper part 91 and the lower part 92. Referring to FIG. 1, before assembling the armature section B onto the stator base 90, glue is first applied onto the outer surface 94 of upper part 91, and then the hub M of stator base 90 is inserted through the hollow silicon steel sheets set 71 and the hollow isolation bushing 72 of stator 70 (see FIGS. 2 and 3), with the silicon steel sheets set 71 being in close contact with the outer surface of upper part 91 on its inner surface, and being supported by the step portion 93 at its bottom, so as to bond the stator 70 to the stator base 90 by glue. A central hole 95 adapted to rotatably support a bearing 60 is provided in the hub M. FIG. 4 shows the condition wherein the bearing 60 is fitted in the central hole 95.

The aforementioned structure of stator base 90 has the following drawbacks. First, since silicon steel sheets set 71 is bonded to the outer surface 94 of hub M by glue which tends to deteriorate under high temperature and of which properly applied quantity can hardly be attained, sufficient bonding strength between stator 70 and stator base 90 cannot be guaranteed, and thus relative displacement in circumferential and axial directions between stator 70 and stator base 90 cannot be effectively avoided. Besides, since no engaging mechanism for the bearing 60 is provided within the central hole 95 of stator base 90 (see FIG. 4), bearing 60 is fitted into central hole 95 by a force fit for positioning it. However, if the fit is too tight, the fitting of rotor shaft into the central bore 61 of bearing 60 will be difficult. On the other hand, if the fit is too loose, it will be very difficult to prevent the displacement of bearing 60 within the central hole 95.

In view of above, the primary object of the present invention is to provide an improved motor structure in which circumferential and axial displacement of the stator relative to the stator base can be positively stopped without using glue, and the yield rate and reliability of produced motors can be greatly improved.

Another object of the present invention is to provide an improved motor structure in which the bearing of the rotor shaft can be reliably located at a fixed position in a central hole of the stator base without using force fitting, and the yield rate and reliability of produced motors can be greatly improved.

Yet another object of the present invention is to provide an improved motor structure in which the circuit board can be firmly held together with the stator so as to prevent relative vibration or uneven clearance between the circuit board and the lower end of stator upon performing a soldering operation in the tin bath, and thus avoid warp or tilt of circuit board in the armature section. Consequently, the yield rate and reliability of produced motors can be greatly improved.

SUMMARY OF THE INVENTION

In order to achieve the aforementioned objects, a motor construction in accordance with the present invention comprises:

a hollow stator base having a substantially cylindrical hub including a central hole; and a hollow stator having a set of silicon steel sheets set of and a central bore through which the hub is inserted upon assembling;

wherein the hub is composed of a plurality of first upright ribs and a plurality of second upright ribs which are of the same number and are alternately arranged in a circumferential direction, and a substantially cylindrical lower portion connected to the lower end of each upright rib, each pair of adjacent first and second upright ribs including rib spaced slightly apart from each other, every first upright rib having an outer engaging portion formed on the upper outer surface thereof and every second upright rib having an outer step portion formed on the outer surface thereof, whereby the silicon steel sheets set of the stator may be engaged by and positioned between the outer engaging portion and the outer step portion so as to retain the stator in an axial direction relative to the stator base.

In the above motor construction, a bearing is fitted into the central hole of the hub. Preferably, every second upright rib of the hub has an inner engaging portion formed on the upper inner surface thereof and every first upright rib of the hub has an inner step portion formed on the inner surface thereof, whereby the bearing may be engaged by and held between the inner engaging portion and the inner step portion so as to retain it in axial direction relative to the stator base.

BRIEF DESCRIPTION OF THE DRAWINGS

The detailed structure, features and characteristics of the present invention will be described more clearly with the descriptions of the preferred embodiments in conjunction with the accompanying drawings, in which.

DETAILED DESCRIPTION OF THE PREFERRED EMBODIMENTS

The motor construction in accordance with the present invention will now be described with reference to FIGS. 8 through 15.

Figure 1:
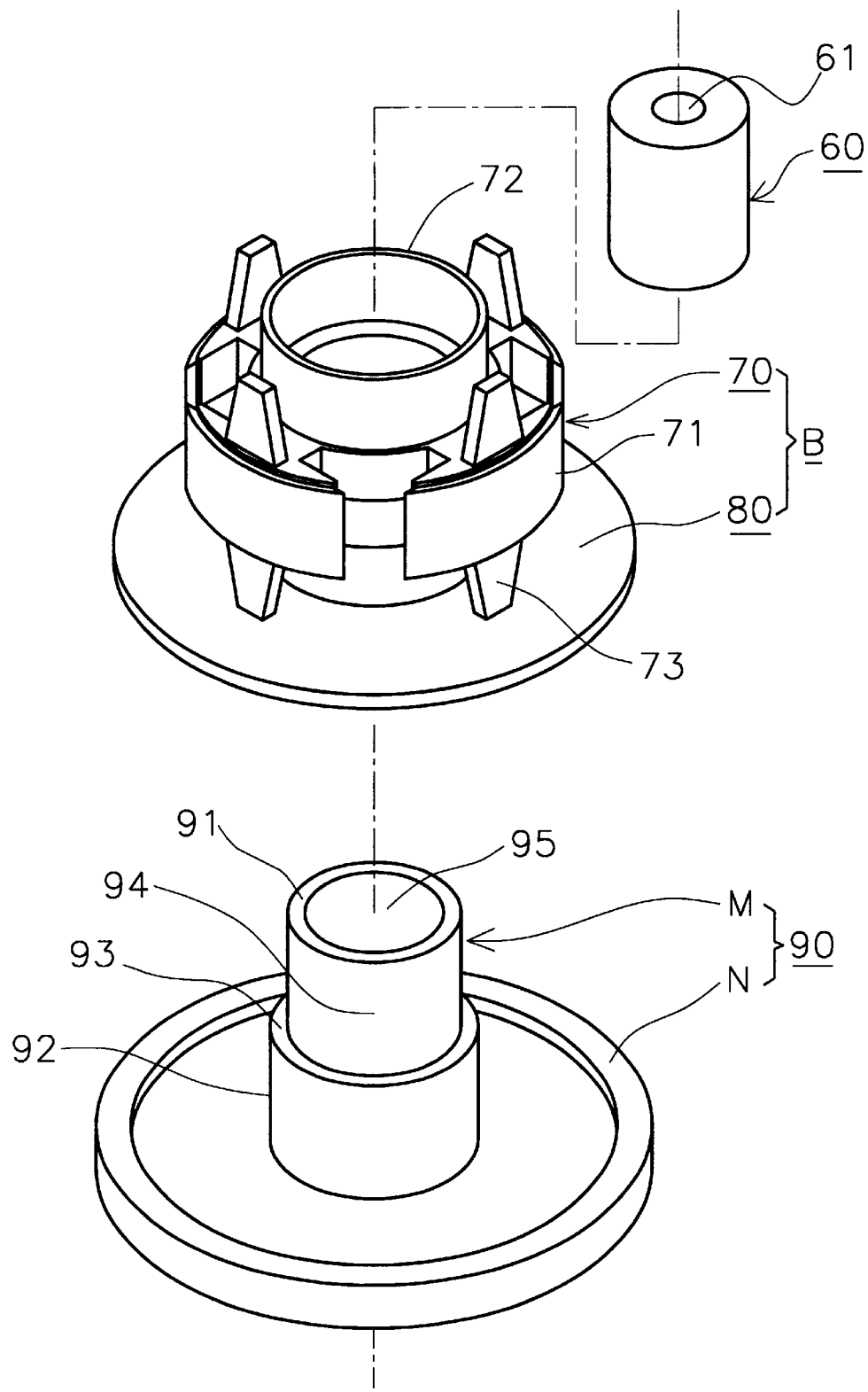
FIG. 1 illustrates a partially exploded perspective view of a conventional DC motor.
Figure 2:
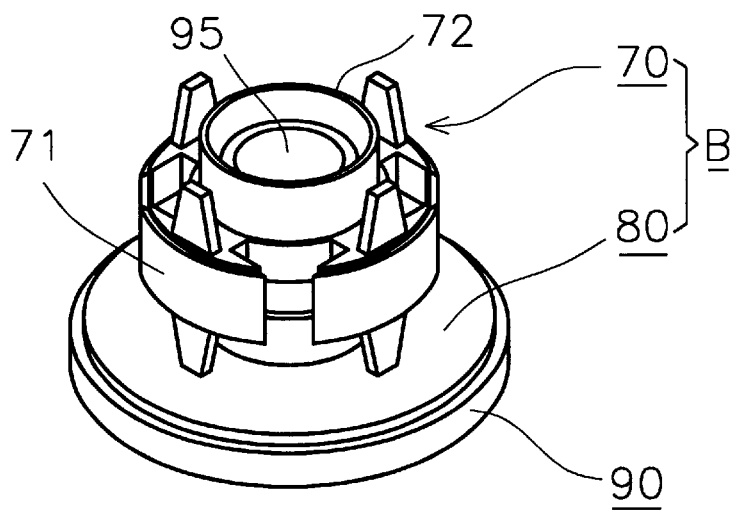
FIG. 2 illustrates an assembly perspective view of the same motor.
Figure 3:
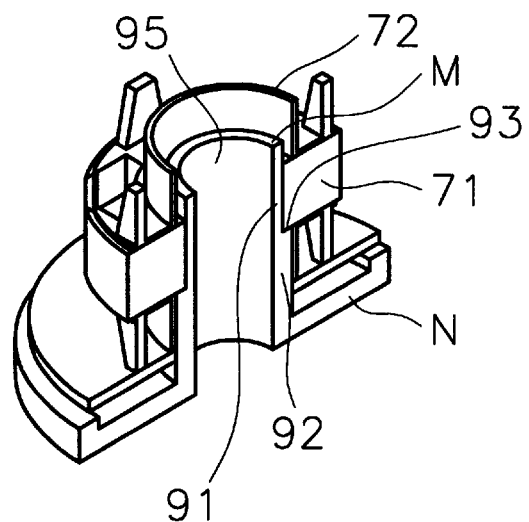
FIG. 3 is a cutaway perspective view of FIG. 2 showing the inner construction of the same motor.
Figure 4:
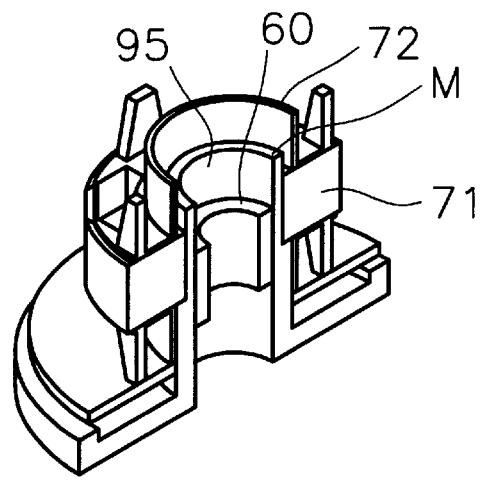
FIG. 4 is similar to FIG. 3, with an bearing being further fitted into the hub.
Figure 5:
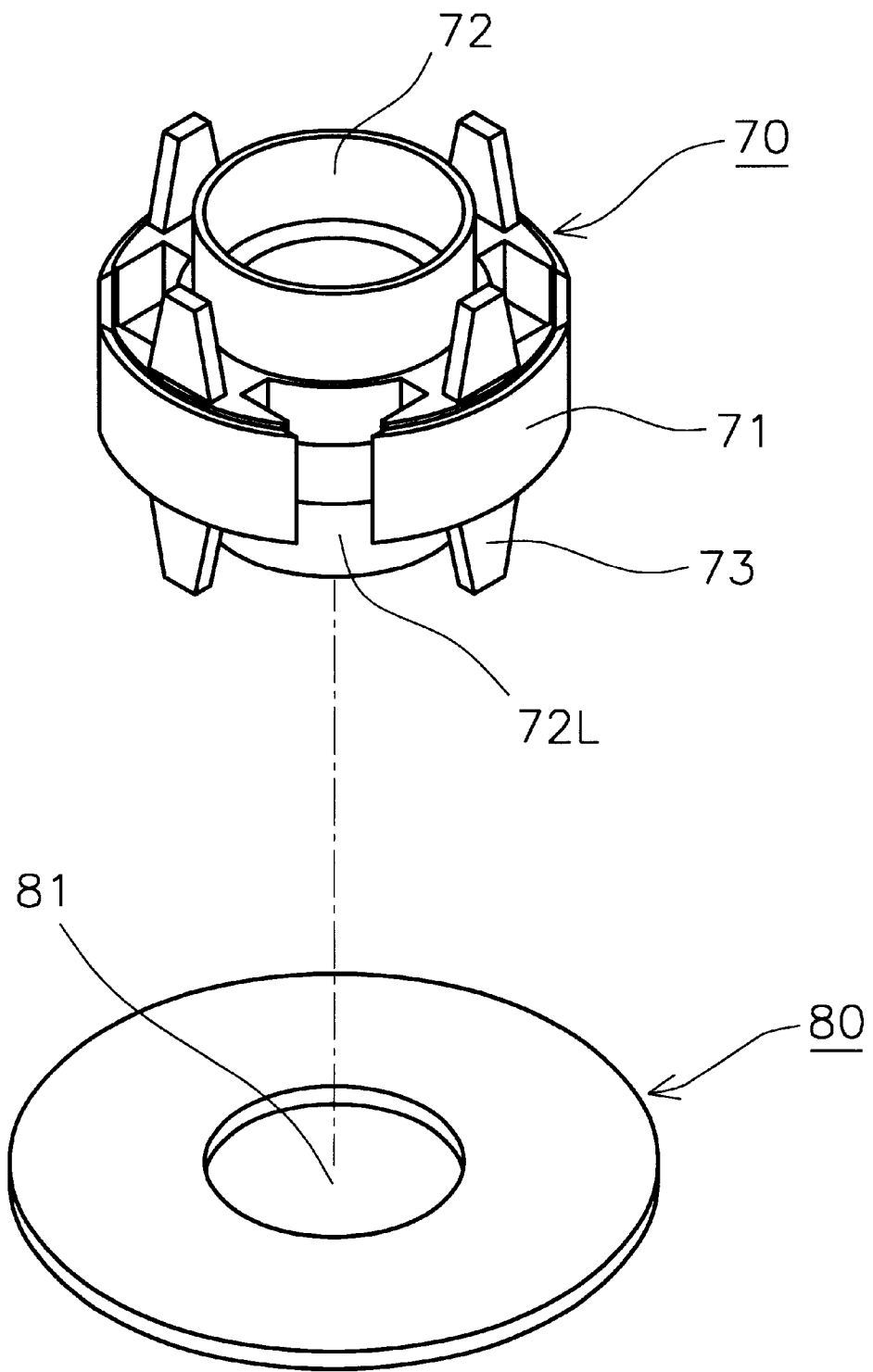
FIG. 5 illustrates an exploded perspective view of the armature section shown in FIG. 1.
Figure 6:
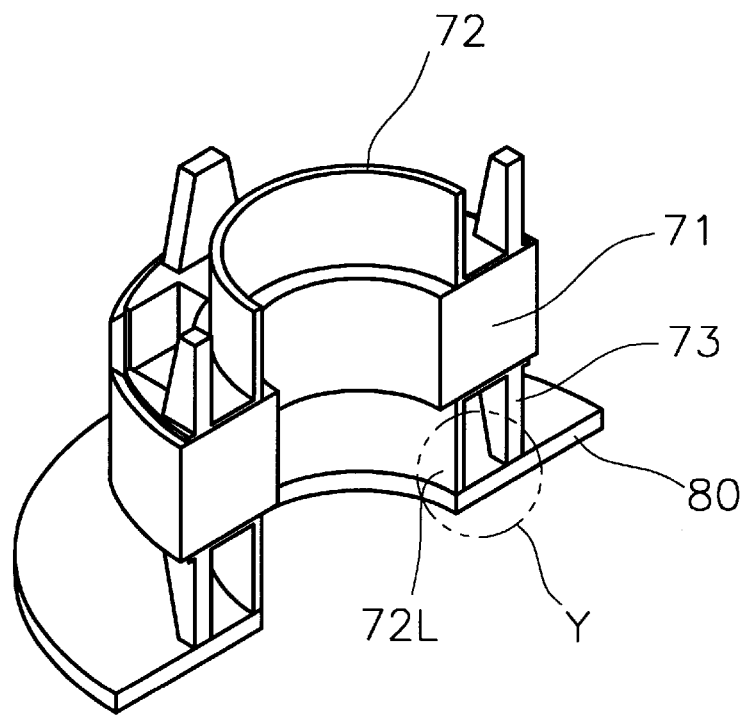
FIG. 6 is a cutaway perspective view of the armature section shown in FIG. 1.
Figure 7A:
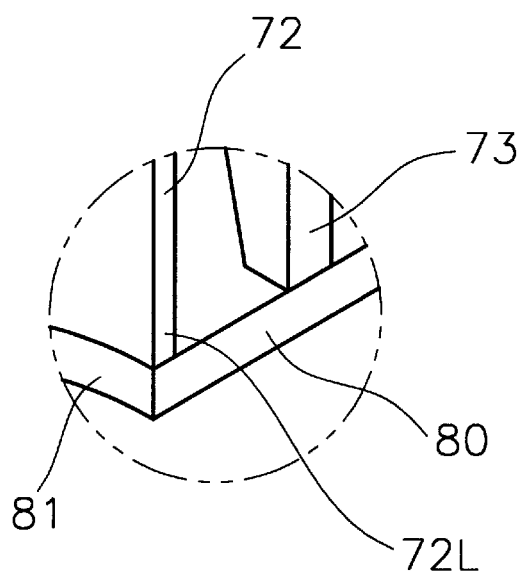
FIG. 7A is an enlarged fragmentary view of "Y" part of FIG. 6.
Figure 7B:
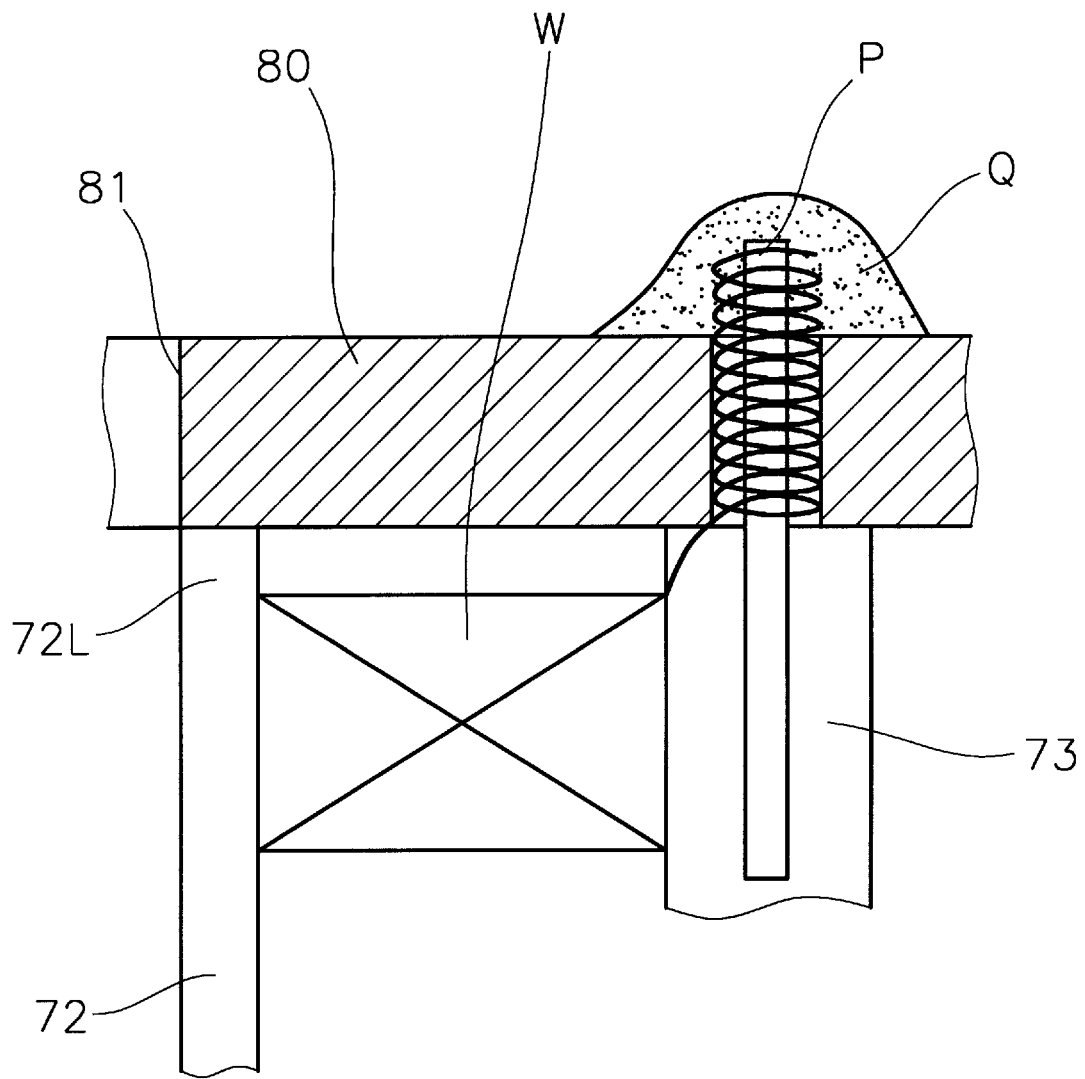
FIG. 7B is a further enlarged sectional view of the vicinity of "Y" part illustrated upside down comparing with FIGS. 6 and 7A.
Figure 8:
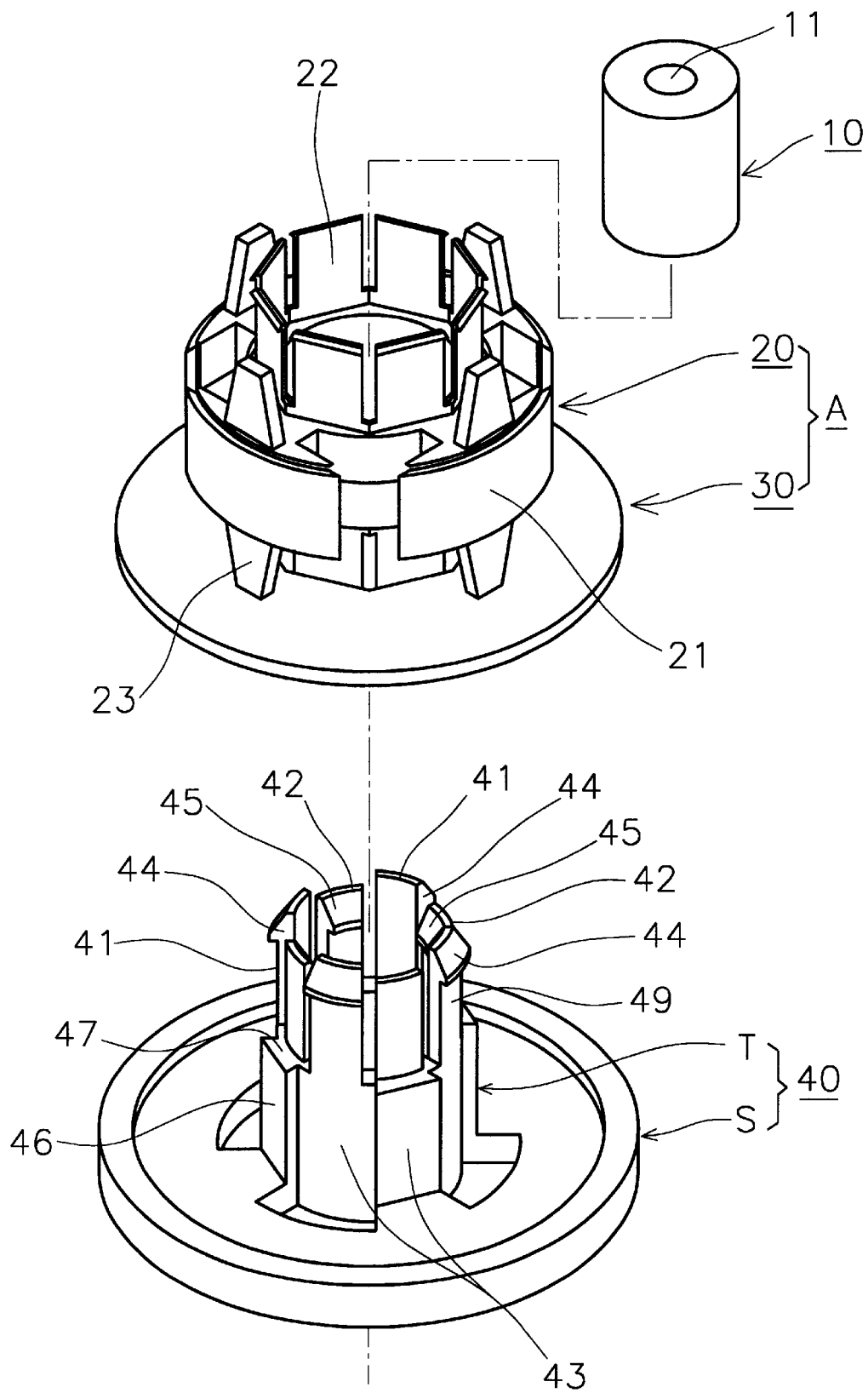
FIG. 8 illustrates a partially exploded perspective view of motor in accordance with the present invention.
Figure 9:
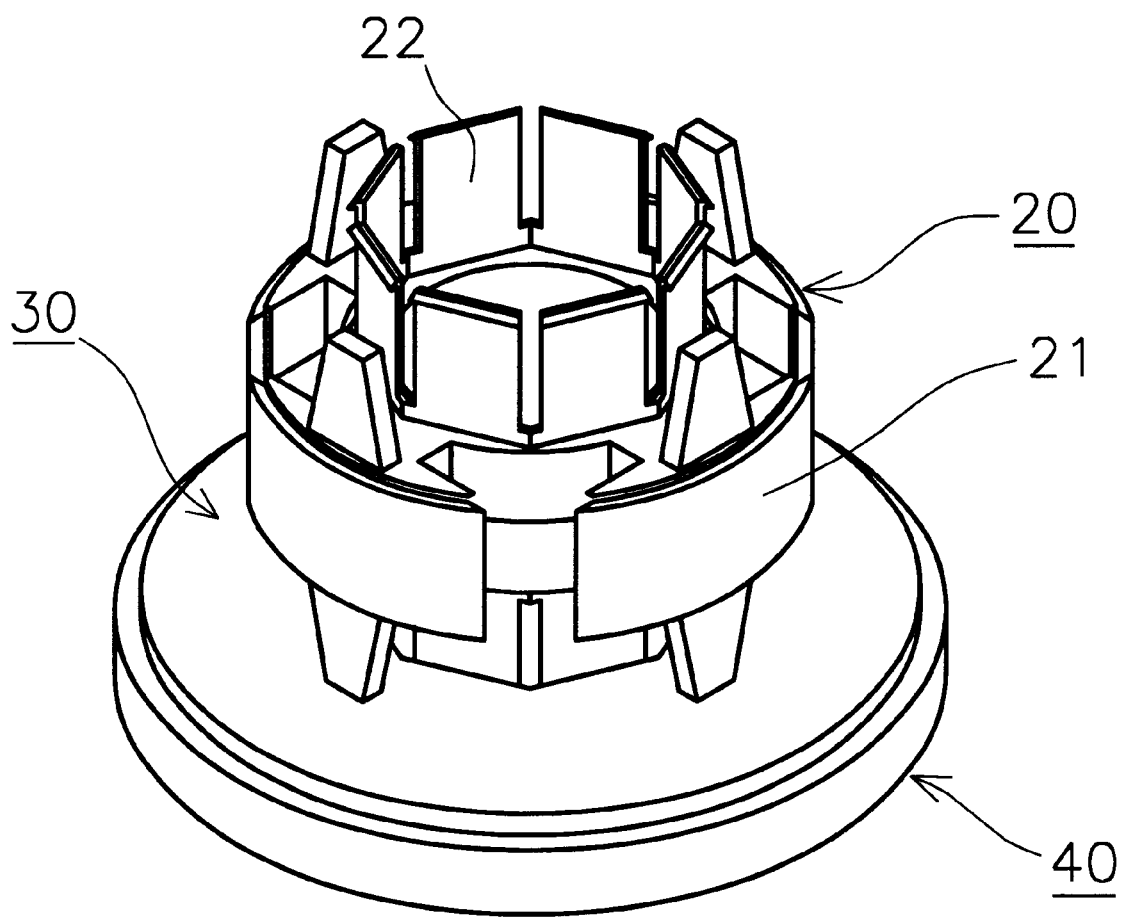
FIG. 9 illustrates a fragmentary assembly perspective view of the same motor as shown in FIG. 8.

FIG. 8 illustrates a partially exploded perspective view of a motor constructed in accordance with the present invention. This motor comprises mainly a rotor (not shown), a bearing 10, an armature section A which is composed of a hollow stator 20 and a circuit board 30, and a hollow stator base 40. The rotor has a rotating shaft (not shown). The bearing 10 is provided with a central hole 11 adapted to rotatably support the rotating shaft of the rotor.

Figure 12:
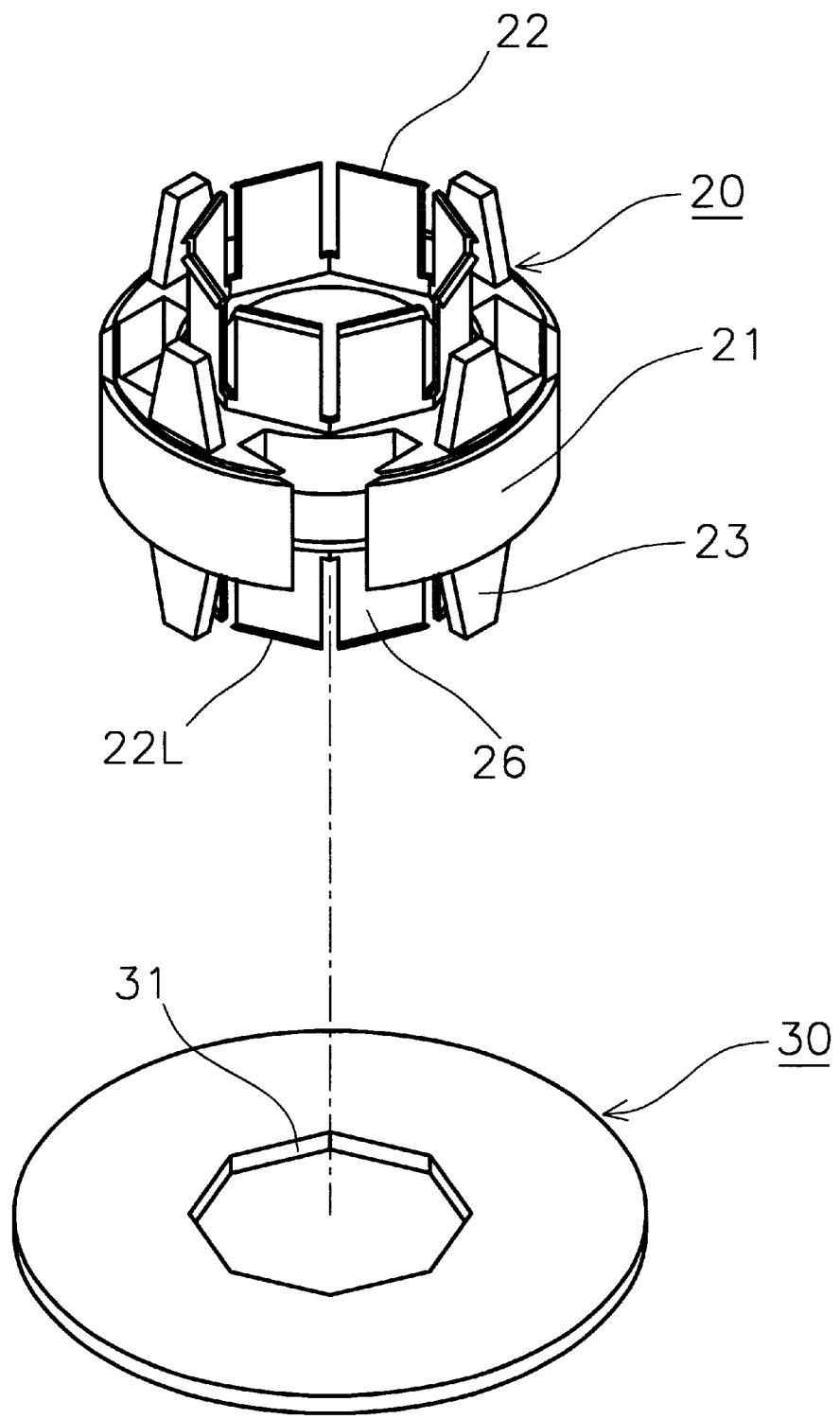
FIG. 12 illustrates an exploded perspective view of the armature section shown in FIG. 8.

The circuit board 30 comprises a motor control circuit (not shown) electrically connected to the winding of the stator described below to control the operation of motor, and a non-circular hole 31 which is of, for example, an octagonal shape as shown in FIG. 12.

Figure 13:
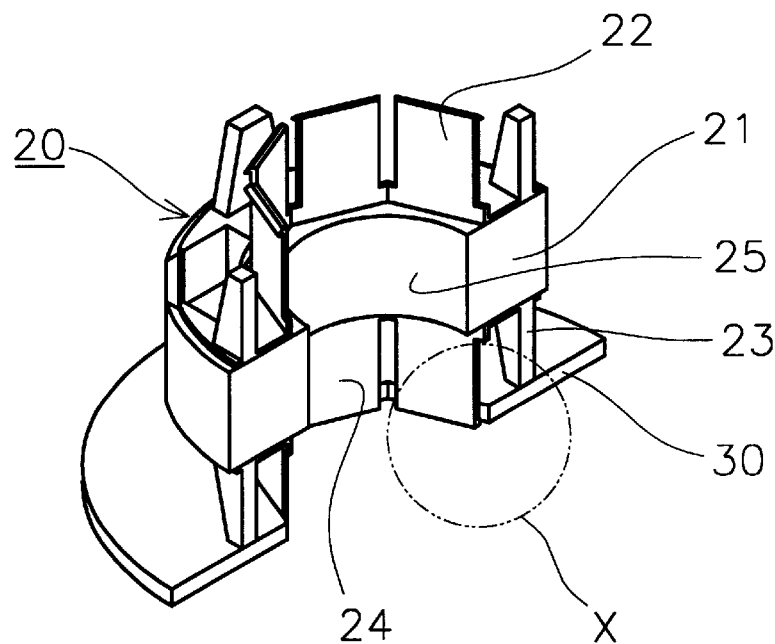
FIG. 13 is a cutaway perspective view of the armature section shown in FIG. 8.

Referring to FIG. 8 and FIG. 13, the stator 20 includes a set 21 of silicon steel sheets composed of plural stacked silicon steel sheets; a winding (not shown in figure) adapted to generate a magnetic field required by the motor; a substantially cylindrical hollow isolation bushing 22 adapted to isolate the silicon steel sheets set 21 and the winding; and plural positioning feet 23. The lower portion 22L of isolation bushing 22 has, on its outer surface, an octagonal prismatic surface as shown in FIG. 12, or another non-cylindrical outer surface 26 corresponding to the shape of the above non-circular hole 31 of circuit board 30 so as to retain the circuit board 30 in a circumferential direction relative to the stator 20 through engagement of the non-circular hole 31 with the non-cylindrical surface 26 in the state when circuit board 30 is assembled to the lower end of stator 20 to form the armature section A.

Figure 14A:
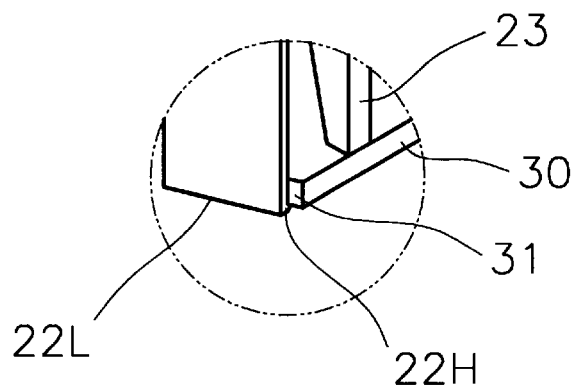
FIG. 14A is an enlarged fragmentary view of "X" part of FIG. 13.
Figure 14B:
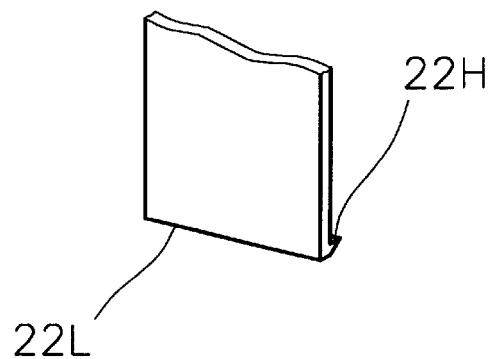
FIG. 14B is a further enlarged fragmentary view showing the construction of lower end of the isolation bushing in the motor of the present invention.
Figure 15:
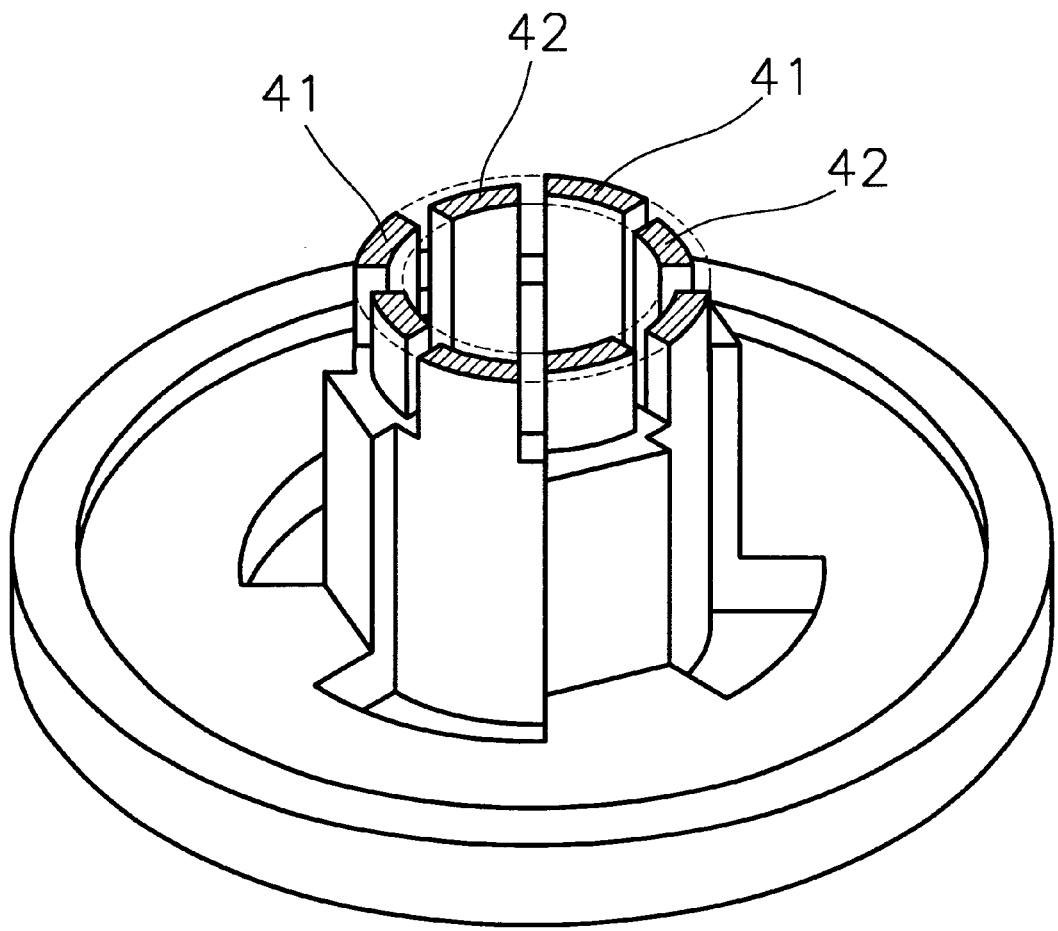
FIG. 15 is a fragmentary perspective view showing the non-interfering design of the hub of stator base of the motor in accordance with the present invention.

Next, the way circuit board 30 is retained in the axial direction relative to the stator 20 is described by referring to FIGS. 13, 14A, 14B. At the lower portion 22L of isolation bushing 22 of the stator 20 are formed several hook-shaped lower retaining portions 22H (only one of which is shown in FIG. 14A) adapted to retain the circuit board 30 by engaging the bottom surface of the circuit board along the inner edge of the non-circular hole 31. In addition, the stator 20 includes plural positioning feet 23 urged against the top surface of the circuit board 30. Thus, the circuit board 30 is retained in an axial direction relative to the stator 20 through the coaction of those lower retaining portions 22H and positioning feet 23.

As shown in FIGS. 8 to 11, the stator base 40 includes a base S adapted to receive circuit board 30; and a substantially cylindrical hollow hub T integrally formed in the central portion of the base S. The hub T includes a central hole adapted to rotatably support the bearing 10. Upon assembling, the motor, the hub T is inserted through the silicon steel sheets set 21 and the isolation bushing 22. The hub T is composed of a plurality of first upright ribs 41 and a plurality of second upright ribs 42 which are of the same number and are alternately arranged in circumferential direction, and a substantially cylindrical lower portion 43 connected to the lower end of each upright rib 41, 42. Each pair of adjacent first upright ribs 41 and second upright ribs 42 are spaced slightly apart from each other. Every first upright rib 41 has an outer engaging portion 44 formed on the upper outer surface thereof and every second upright rib 42 has an outer step portion 47 formed on the outer surface thereof. Thus, the silicon steel sheets set 21 of the stator may be engaged by and between the outer engaging portions 44 and the outer step portions 47 so as to retain the stator 20 in axial direction relative to the stator base 40.

Further, a first non-cylindrical outer surface 46 (see FIGS. 8, 10) may be provided on the outer surface of the hub T, and a second non-cylindrical inner surface 24 (see FIG. 13) corresponding to the above first non-cylindrical outer surface 46 may be provided on the inner surface of the isolation bushing 22, whereby the stator 20 is retained in a circumferential direction relative to the stator base 40 through engagement between the first non-cylindrical outer surface 46 and the second non-cylindrical inner surface 24 in an assembled state. Alternatively, the same function may be achieved through the engagement of a first non-cylindrical outer surface provided on the outer surface 49 of each first upright rib 41 of the hub T (see FIGS. 8, 10) and a second non-cylindrical inner surface provided on the inner surface 25 of the silicon steel sheets set 21 (see FIG. 13). The aforementioned non-cylindrical surfaces may together form, for example, an octagonal prismatic surface, although the invention is not limited to a particular shape.

Figure 10:
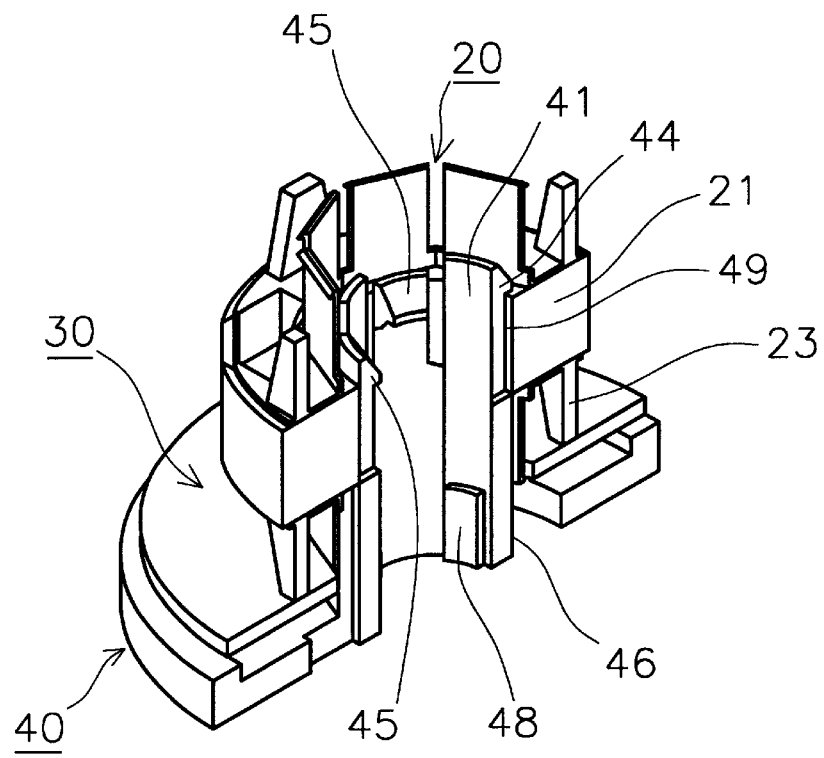
FIG. 10 is a cutaway perspective view of FIG. 9 showing the inner construction of the same motor.
Figure 11:
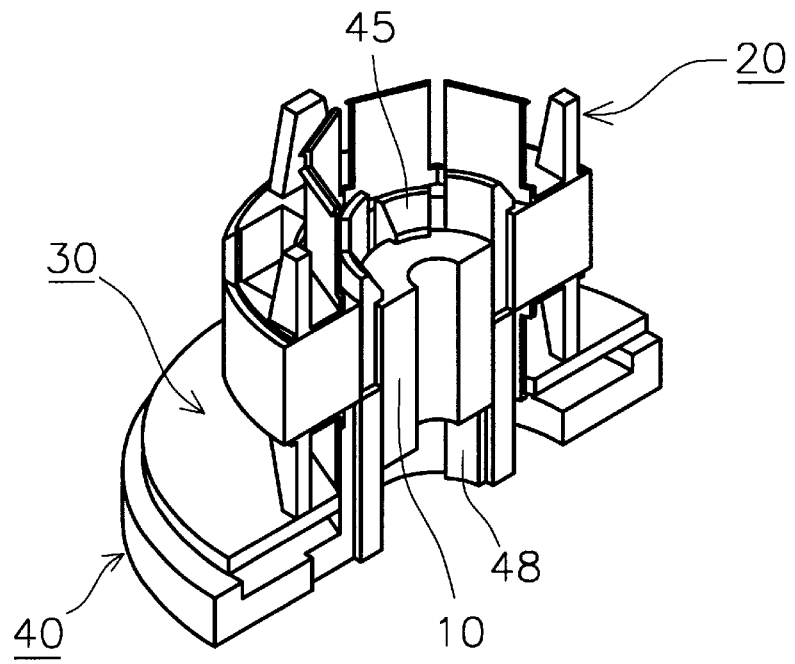
FIG. 11 is similar to FIG. 10, with an bearing being further fitted into the hub.

Referring particularly to FIGS. 10, 11, an inner engaging portion 45 and an inner step portion 48 may be provided on each of the second upright ribs 42 of the hub T and each of the first upright ribs 41 of the hub T, respectively, so that the bearing 10 (FIG. 11) may be engaged by and between the inner engaging portions 45 and the inner step portions 48 so as to retain it in an axial direction relative to the stator base 40.

Moreover, during fitting of the bearing 10 into the central hole of hub T and insertion of the hub T of the stator base 40 into the hollow stator 20, the first upright ribs 41 and the second upright ribs 42 are pushed inwards and outwards, respectively, by the inner surface of the stator 20 and the bearing 10. Thus, the first upright ribs 41 are preferably located radially outwards of the second upright ribs 42 so as to avoid interference between inward movement of the first upright ribs 41 and outward movement of the second upright ribs 42 when assembling the motor.

In accordance with the above improved motor structure, circumferential and axial displacement of the stator relative to the stator base can be positively stopped without using glue. Besides, the bearing of the rotor shaft can be positively located at a fixed position in a central hole of stator base without using force fitting. In addition, the circuit board can be firmly held together with the stator so as to prevent relative vibration or uneven clearance between the circuit board and the lower end of stator upon performing a soldering operation in a tin bath, and thus avoid warp or tilt of circuit board in the armature section. Consequently, the yield rate and reliability of produced motors can be greatly improved.

While this invention has been described with respect to illustrative embodiments, this description is not intended to be construed in a limiting sense. Upon reference to this description, various modifications of the illustrative embodiment, as well as other embodiments of this invention, will be apparent to persons skilled in the art. It is contemplated that the appended claims will cover any such modifications or embodiments that fall within the scope of the invention.

What is claimed is:

1. An improved motor construction, comprising:
   a hollow stator base having a substantially cylindrical hub including a central hole; and
   a hollow stator including a set of silicon steel sheets and a central bore through which said hub is inserted upon assembly of the motor,
   wherein said hub comprises:
      a plurality of first upright ribs and a plurality of second upright ribs, a number of said first upright ribs being equal to a number of said second upright ribs and said first and second upright ribs being alternately arranged in a circumferential direction; and
      a substantially cylindrical lower portion connected to the lower end of each said upright rib, respective pairs of adjacent first and second upright ribs being spaced slightly apart from each other, each said first upright rib having an outwardly extending engaging portion formed on an upper outer surface thereof and each said second upright rib having an outer step portion formed on an outer surface thereof, wherein said set of silicon steel sheets is engaged by and axially held between said outwardly extending engaging portions of said first upright ribs and said outer step portions of said second upright ribs so as to position said stator axially relative to said stator base.

2. An improved motor construction as claimed in claim 1, further comprising a rotor bearing fitted into said central hole of said hub, each said second upright rib of said hub having an inwardly extending engaging portion formed on an upper inner surface of said second upright rib and each said first upright rib of said hub having an inner step portion formed on an inner surface of said first upright rib, wherein said bearing is engaged by and axially held between said inwardly extending engaging portions of said second upright ribs and said inner step portions of said first upright ribs to position said bearing portion axially relative to said stator base.

3. An improved motor construction as claimed in claim 2, wherein said first upright ribs are located radially outwards of said second upright ribs so that inward movement of said first upright ribs during assembly of said set of silicon steel sheets will not interfere with outward movement of said second upright ribs resulting from fitting of said bearing.

* * * * *